April 5, 1955   E. H. PHREANER   2,705,536
CUSHIONED HORSESHOE
Filed May 1, 1950
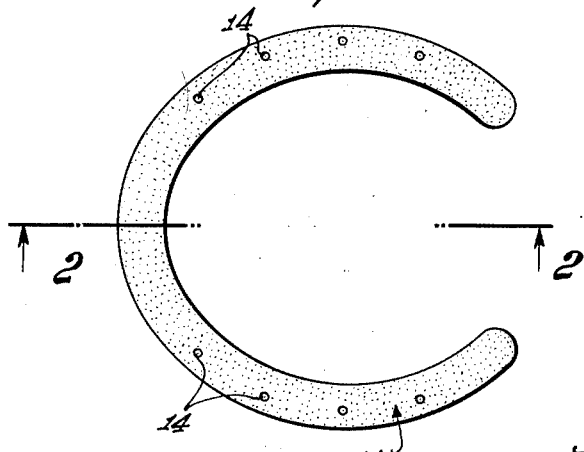
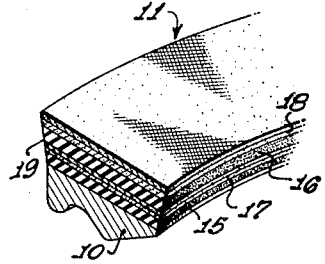
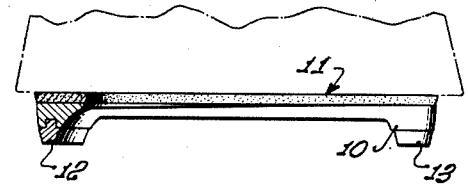
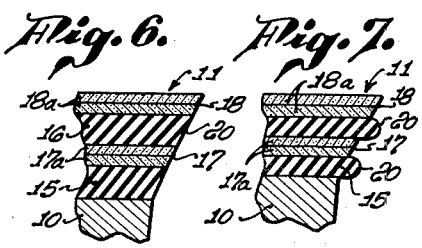
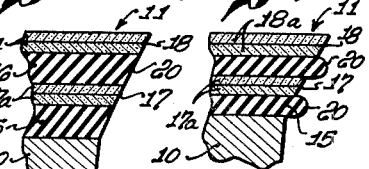
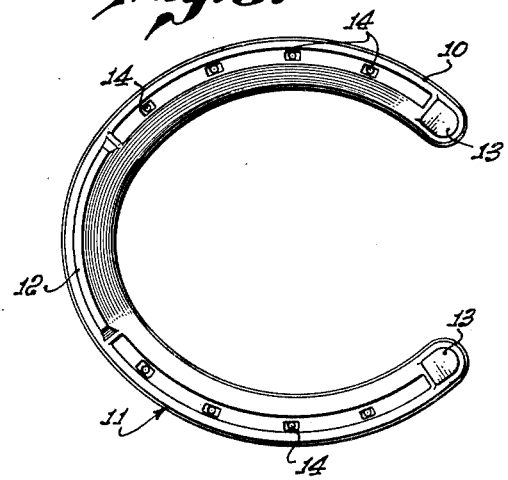
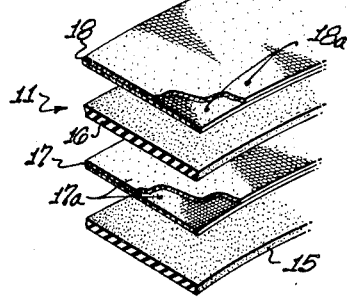
ELLIS H. PHREANER,
INVENTOR.
BY
ATTORNEY.

U̇nited States Patent Office 2,705,536
Patented Apr. 5, 1955

2,705,536
CUSHIONED HORSESHOE
Ellis H. Phreaner, Beverly Hills, Calif.

Application May 1, 1950, Serial No. 159,185

2 Claims. (Cl. 168—14)

This invention relates generally to improved horseshoes and particularly to novel cushioned shoes serving to prevent or minimize leg injuries to racing horses.

One of the greatest hazards in horse racing is the ever present danger of injury to a horse's legs from the terrific pounding of its hooves against a track or ground surface while running. This pounding may weaken the legs of a horse to an extent materially decreasing its speed or even necessitating withdrawal of the animal from competition. Further, though there are certain treatments which may be followed in attempting to cure this type of injury, such treatments usually require that the horse be relatively inactive for a considerable period of time and are seldom completely satisfactory.

The general object of the present invention is to provide a shoe for racing horses, specially formed to cushion the animal's steps in a manner decreasing the possibility of a leg injury. For this purpose, I employ a unique resiliently compressible pad extending along the upper hoof side of the shoe body and serving as a cushion between the animal's hoof and the shoe. Particularly contemplated is a pad formed of a cellular or spongy material containing a large number of tiny air cells sealed against intercommunication in a manner augmenting both the compressibility and resilience of the material itself.

It has been discovered that an intimate mixture of cork particles and an elastomer, such as rubber, bonded together in sheet form, is particularly effective for this purpose. Specifically, the cellular cork component is desirable for its relatively great compressibility and resilience, and the rubber serves to supplement the resilience of the cork while also strengthening the cushion and binding together the cork.

To reinforce and strengthen the resilient pad and to facilitate handling of the shoe, I preferably bond the pad along its entire extent directly to the upper surface of the horseshoe body. Further, I find it desirable to reinforce the cushion with one or more layers of a relatively strong material bonded to the cushion in a manner preventing its unwanted deformation under compression and evenly distributing the compressive forces over the entire area of the cushion. These reinforcing layers are most effective when formed of a woven fabric, such as fiber glass cloth, impregnated with a relatively strong and hard plastic material. As will appear, the cushion in its preferred form comprises two or more thin layers of resilient material reinforced by a number of fabric sheets extending between the resilient layers and along the upper surface of the top layer.

As an additional feature, I progressively broaden the cushion between its lower shoe engaging surface and its upper hoof engaging surface in a manner increasing the compressibility of the pad by increasing the "free" or unrestricted outer edge area of the resilient plies.

The above and other features and objects of the present invention will be better understood from the following description of the typical embodiment illustrated in the accompanying drawing, in which Fig. 1 is a plan view of a cushioned horseshoe embodying the invention;

Fig. 2 is a central vertical section through the shoe taken on line 2—2 of Fig. 1;

Fig. 3 is a bottom view of the shoe;

Fig. 4 is an enlarged perspective view of the cushioned shoe cut away along a vertical plane to show its various superimposed plies;

Fig. 5 is an exploded perspective view of the cushion;

Fig. 6 is an enlarged fragmentary vertical section through the shoe illustrating especially the upward broadening of the cushion; and Fig. 7 is a view corresponding to Fig. 6 but showing the cushion under compression to illustrate the outward bulging of the outer free edges of the resilient layers.

The illustrated cushioned shoe comprises essentially a conventional horseshoe body 10 and a laminated pad 11 extending along and bonded to the upper flat hoof side of this body. The major portion of the body is preferably formed of a relatively light metal, such as aluminum or aluminum alloy, and may have downwardly projecting cleats 12 and 13 separately formed of a harder metal. The usual nail holes 14 extend through both the body and cushion at locations spaced along their opposite sides.

Cushion 11 comprises a number of superimposed plies of different materials bonded together along their engaging surfaces and to the shoe to form a composite pad characterized by considerable compressibility and resilience while being well integrated, strong and resistive to undesired deformation. The resiliency of the laminated cushion is provided primarily by a bottom ply 15 directly adjacent the shoe body and an upper ply 16. These two plies are formed of a suitable resiliently compressible material, preferably of cellular formation and containing a large number of tiny air pockets sealed against intercommunication to effectively absorb an appreciable part of the shock as an animal runs or walks.

Best results have been obtained by forming resilient layers 15 and 16 of a composition including ground cork and an elastomer, such as rubber, synthetic rubber, or the more elastic type of plastics, as for instance, high styrene (75%), butadiene (25%), copolymers, or the vinyl resins. Of the various elastomers, I prefer to use a rubber material, and have found that a very springy and resilient composition, which retains good resistance to compression set, can be compounded as follows: Polychloroprene 100 parts by weight, silicone fluids 10 parts, calcium silicate 20 parts, zinc oxide 5 parts, calcined magnesium oxide 4 parts, and ground cork, of a size that will pass a 5 to an inch screen but be retained on a 10 to an inch screen, 50 parts. This composition is compounded and sheeted on a rubber mill in thin sheets of from 1/16 to 1/8 inch in thickness. As will appear later, these sheets are vulcanized simultaneously with certain bonding cements during the final step in the manufacture of the shoe. In the ultimate product, the cork being compressible by virtue of its contained sealed air pockets, has a cushioning effect which would not be attainable with a resilient but incompressible material, while the rubber (polychloroprene) binds the cork particles together and augments their elasticity.

Between these two resilient sheets 15 and 16, I provide two sheets of reinforcing fabric 17a impregnated and coated with a hard drying cement material of plastic and rubber composition adapted to serve the dual purposes of bonding together the resilient plies and the fabric reinforcing sheets, while forming with these fabric sheets a composite relatively stiff and hard intermediate reinforcing ply 17. A suitable cement having the desired characteristics of hardness and adaptability for adhesion to rubber may be composed as follows: Polychloroprene 50 parts, a phenol formaldehyde resin 50 parts, silicone fluid 10 parts, calcium silicate 50 parts, zinc oxide 5 parts, calcined magnesium oxide 4 parts, and hexamethylenetetramine 5 parts; all thinned to a paste consistency with 15 parts methyl ethyl ketone and 15 parts toluene, to 70 parts of the rubber plastic compound as formulated. This cement, which we shall call cement A, also has the characteristic of adhering to metal, and is therefore employed for bonding the lower resilient ply 15 to the upper surface of the horseshoe body 10.

Above the upper resilient ply 16, I provide a top relatively hard and stiff layer 18 comprising a pair of fabric sheets 18a, preferably formed of fiberglass cloth, impregnated with a polyester resin to which has been added 5 parts of benzoyl peroxide as a catalyst. These impregnated fabric sheets are bonded to the upper surface of the upper resilient layer 16 by a cement adapted to adhere to both the upper plastic material and the lower rubber material, and containing a relatively high plastic content for hardening. This cement, which we shall call cement B, preferably consists of polychloroprene 60 parts by weight, a terpene-phenolic resin 40 parts, silicone fluid 20 parts, calcium silicate 40 parts, zinc oxide 5 parts, calcined magnesium oxide 4 parts, and benzoyl peroxide 10 parts, the solvents being methyl ethyl ketone and toluene in equal parts, to provide suitable cement viscosities, up to 80 per cent solids (by weight) having been found satisfactory.

As seen in Fig. 6, the various plies of cushion 11 progressively increase in width between the lower shoe engaging surface of the pad and its upper hoof engaging surface. In this manner, the lateral "free" or unrestrained edge surfaces 20 of the resilient cushions 15 and 16 are increased in area to permit greater bulging of the resilient layers at these edges when under compression (see Fig. 7). As will be understood, this increase in free area and in lateral bulging correspondingly increases the compressibility of the cushion as a whole and therefore its capacity for blow absorption.

In assembling the present padded shoe, the two resilient layers 15 and 16 are first sheeted from the previously discussed rubber and cork composition. The four fiber glass plies 17a and 18a are then cut to size. Cement A is applied to the upper surface of the shoe body 10, both surfaces of lower resilient layer 15, and the under surface of the upper resilient layer 16. The two fiber glass sheets 17a are then impregnated with the same cement material, after which these various layers are placed in the illustrated superimposed relation upon the upper surface of the shoe. The two upper fiber glass sheets 18a are impregnated with a polyester resin as specified, and the upper surface of upper resilient layer 16 is coated with cement B, after which the upper fiber glass sheets are placed in position. These various layers are then firmly pressed together under a pressure of from 16 to 50 pounds per square inch, and are heated in an oven at 270° F. for two hours to simultaneously cure the cements and resilient plies and form an integrated laminated cushion on the upper surface of the shoe. This composite cushion is resiliently compressible to absorb the shock from the pounding of the shoe against a ground or a track surface, while being reinforced and strengthened by the fabric and plastic layers and by the secure interbonding between the various plies and to the upper surface of the shoe.

With more specific reference to the bonding process, the heat simultaneously cures the polychloroprene, the phenolformaldehyde, and the terpene-phenolic and polyester resins of the resilient layers and cements in a manner forming close chemical bonds between these mutually reactive chemical groups and thus producing a well integrated cushion. Because of the co-vulcanization and co-polymerization of these various constituents, the pad shows extreme resistance to crushing and tearing forces and to the elements. While it is recognized that adhesion or bonding is a complex phenomenon, the presence in the cements and resilient layers of mutually reactive chemical groups under conditions which provide for the formation of new chemical bonds, as described by these formulations and processes, is a unique and important feature assuring the retention in use of the strength and resilience of the laminated cushion.

I claim:

1. A padded horse shoe comprising a horse shoe body and a laminated cushion extending along the upper hoof side of said body, said cushion comprising two plies of resiliently compressible cellular material containing intermixed rubber and cork vulcanized together, a first sheet of reinforcing fabric between said plies, a hard setting cement impregnating said fabric and bonding it to the resilient plies, cement tightly bonding the bottom one of said resilient plies across substantially its entire extent to the upper surface of said horse shoe body, and a second sheet of fabric impregnated with a hard setting resinous plastic material extending along the upper surface of the upper one of said resilient plies and bonded thereto.

2. A horse shoe as claimed in claim 1, in which said reinforcing fabric is a fiber glass fabric.

References Cited in the file of this patent

UNITED STATES PATENTS

| Number | Name | Date |
|---|---|---|
| 158,284 | Kintzing | Dec. 29, 1874 |
| 479,912 | Mooney | Aug. 2, 1892 |
| 546,145 | Gibbs | Sept. 10, 1895 |
| 562,302 | Juillard | June 16, 1896 |
| 602,046 | Hitch | Apr. 5, 1898 |
| 772,685 | Symons | Oct. 18, 1904 |
| 815,399 | Anderson | Mar. 20, 1906 |
| 948,245 | Owens | Feb. 1, 1910 |
| 965,259 | Weber | July 26, 1910 |
| 971,138 | McCormick | Sept. 27, 1910 |
| 1,357,909 | Sherwood | Nov. 2, 1920 |
| 1,710,379 | Page | Apr. 23, 1929 |
| 1,990,937 | Forbes | Feb. 12, 1935 |
| 2,158,033 | McKinney | May 9, 1939 |
| 2,389,210 | Pitman | Nov. 20, 1945 |
| 2,424,813 | Gegner | July 29, 1947 |
| 2,576,073 | Kropa et al. | Nov. 20, 1951 |